United States Patent [19]
Feick

[11] Patent Number: 6,113,828
[45] Date of Patent: Sep. 5, 2000

[54] METHOD OF INJECTION MOLDING SEVERING A LOOPED GATE PASSAGE

[76] Inventor: Murray L. Feick, 167 Sweetbriar Drive, Kitchener, Ontario, Canada, N2M 4S9

[21] Appl. No.: 09/045,847

[22] Filed: Mar. 23, 1998

Related U.S. Application Data

[60] Provisional application No. 60/042,233, Mar. 24, 1997.
[51] Int. Cl.⁷ .................................................. B29C 45/38
[52] U.S. Cl. ...................... 264/161; 264/328.9; 425/553; 425/DIG. 51
[58] Field of Search ................................ 264/161, 328.1, 264/328.9, 334; 425/553, 554, 556, 292, 298, DIG. 51

[56] References Cited

U.S. PATENT DOCUMENTS

| | | | |
|---|---|---|---|
| 3,371,385 | 3/1968 | Cordio et al. | 425/DIG. 51 |
| 3,737,271 | 6/1973 | Novak | 425/DIG. 51 |
| 4,036,571 | 7/1977 | Geyer et al. | 264/161 |

FOREIGN PATENT DOCUMENTS

| | | | |
|---|---|---|---|
| 53-65363 | 6/1978 | Japan | 264/161 |
| 58-71137 | 4/1983 | Japan | 425/556 |
| 61-35923 | 2/1986 | Japan | 425/553 |
| 577283 | 3/1993 | Japan | 425/556 |
| 6-143352 | 5/1994 | Japan | 425/556 |
| 1484748 | 6/1989 | U.S.S.R. | 425/556 |

*Primary Examiner*—Jill L. Heitbrink
*Attorney, Agent, or Firm*—Daryl W. Schnurr

[57] ABSTRACT

A high pressure multi-cavity injection molding system has an adjustable overflow cavity on each of the first to fill cavities. The volume of the overflow cavity is remotely adjustable without removing the overflow cavity from the system. In a mold system including a family of molds, the overflow cavities are sized so that the first to fill cavity(ies) and the overflow cavity(ies) fill at substantially the same pressure and time as the last to fill cavity. A looped gate passage is used to automatically sever the molded plastic at an edge of the cavities when the mold is opened. The looped gate passage does not constrict the flow of plastic into the cavities during the molding process.

2 Claims, 19 Drawing Sheets

View C 6,113,828

METHOD OF INJECTION MOLDING SEVERING A LOOPED GATE PASSAGE

This application claims benefit of provisional application Ser. No. 60/041,233 filed Mar. 24, 1997.

BACKGROUND OF THE INVENTION

1. Field of the Invention

This invention relates to a multi-cavity high pressure injection molding system and method of operation thereof where the cavity or cavities that are first to fill cavities each have an overflow cavity connected thereto, the overflow cavity being adjustable in size without removing the overflow cavity from the molding system.

2. Description of the Prior Art

It is known to have family molds having multi-cavities used to make different components of the same part simultaneously. It has been recognized with family molds that it is important to balance the mold system so that all of the cavities fill at approximately the same time with approximately the same pressure. Otherwise, some components will be overpacked while others will be underpacked leading to different shrinkage properties and different performance characteristics of the various components that make up the same part. For example, the plastic from smaller cavities might have a different gloss from plastic in the larger cavities or may be much more brittle or plastic obtained from larger cavities may have sinking on the surface. It is desirable that the cavities are controlled so that the pressure within each cavity and the time to fill each cavity is approximately the same.

The Maus, et al. U.S. Pat. No. 5,512,221 describes a method and apparatus for making contact lenses where the mold is adjustable. The mold is a low pressure mold and is adjustable to change the thickness of the lens being molded. As can be appreciated, the degree of change is extremely minute and the mold is a single mold and is not part of a molding system. The Hendry U.S. Pat. No. 5,098,637 describes a process for injection molding hollow plastic articles by sequentially injecting fluent plastic and gas into a mold cavity. The Hendry U.S. Pat. No. 5,607,640 describes an injection molding system where the size of a spill cavity varies during the injection of plastic. With the present invention, there is no injection of gas sequentially with the plastic and the overflow cavity has a fixed volume during the molding process.

While automated degating is known, it is carried out by a passageway being machined into the mold steel to reach the cavity. The passageway tapers as the cavity is approached and the material in the passageway is severed from the side wall of the cavity when the material is ejected at the end of the molding process. This type of gate restricts flow and cannot be used effectively for material flow passing from a part cavity to an overflow cavity.

SUMMARY OF THE INVENTION

It is an object of the present invention to provide a molding system and a method of operation thereof whereby each of the first to fill cavities has an overflow cavity that is adjustable in size without removing the overflow cavities from the molding system. It is a further object of the present invention to provide a high pressure injection molding system where the overflow cavities are adjustable longitudinally.

A high pressure injection molding system for material to be molded has an inlet with at least a first cavity and a second cavity connected thereto, said second cavity being a first to fill cavity, said second cavity being connected to an overflow cavity, said overflow cavity being adjustable in size without removing the overflow cavity from the molding system.

A method of high pressure injection molding material to be molded in a molding system having a mold with an inlet connected to at least a first cavity and a second cavity, said second cavity being a first to fill cavity, said second cavity being connected to an overflow cavity that is adjustable in size without removing said overflow cavity from said mold, said method comprising calculating an optimum size of the overflow cavity based on the pressure, temperature and material that will be used to fill the cavities, adjusting the overflow cavity to the size calculated and injecting the material into the molding system to fill the first cavity and to fill the second cavity and overflow cavity simultaneously. Ultimately, the material is removed from the cavities and the material in the overflow cavity is broken away from the material in the second cavity.

In some uses of the apparatus and method, the cavities will be identical in size but different pressures will occur in the cavities because of slightly different wall thickness or different length of the input lines. The cavities will not fill at the same rate and the cavity that fills first will have an adjustable overflow cavity connected thereto. A high pressure molding system and method can have an overflow cavity or cavities that are not adjustable.

DESCRIPTION OF A PREFERRED EMBODIMENT

Figure 1A:
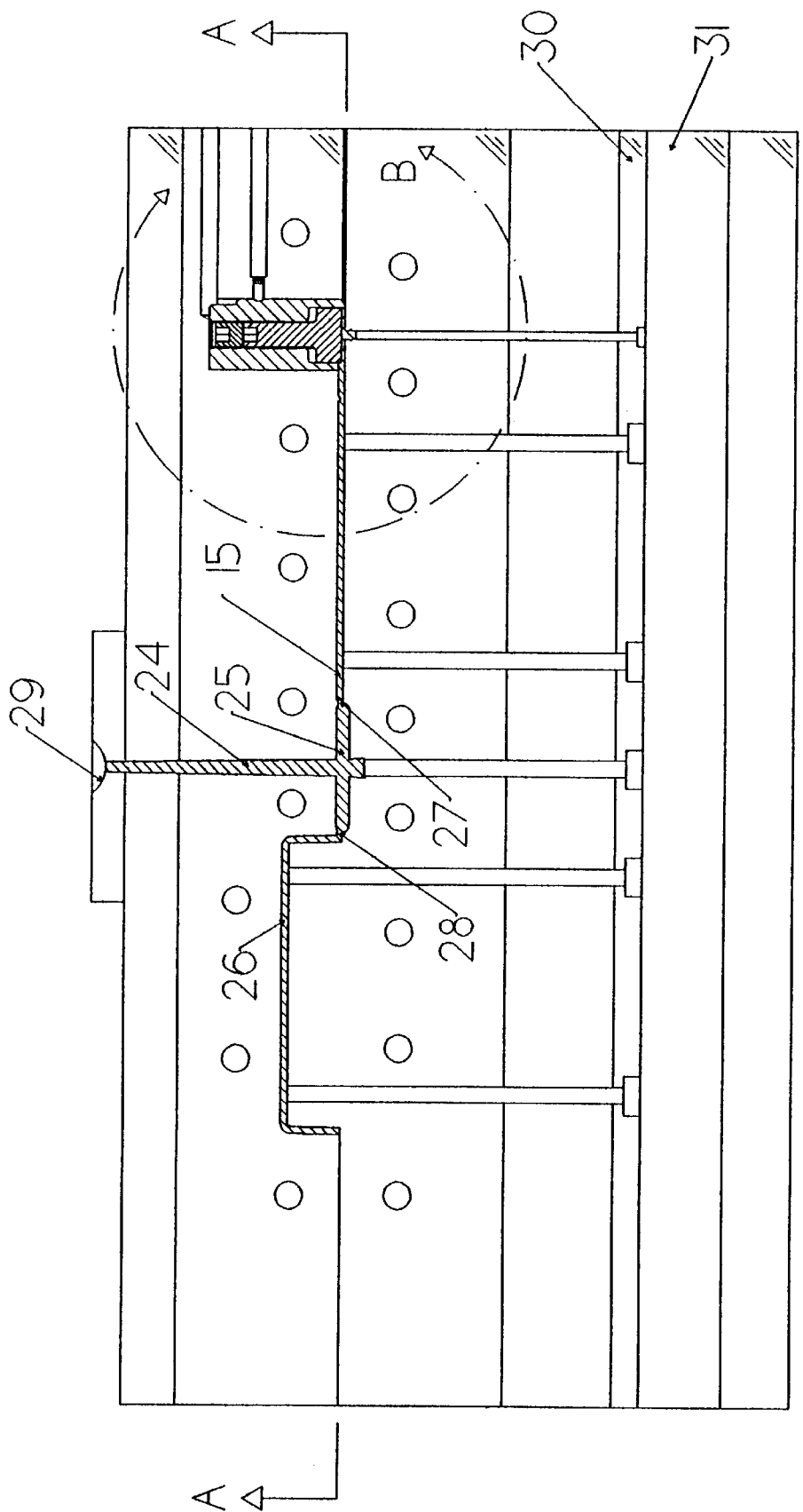
FIG. 1A is a top view of a multi-cavity molding system having a laterally adjustable overflow cavity.
Figure 1B:
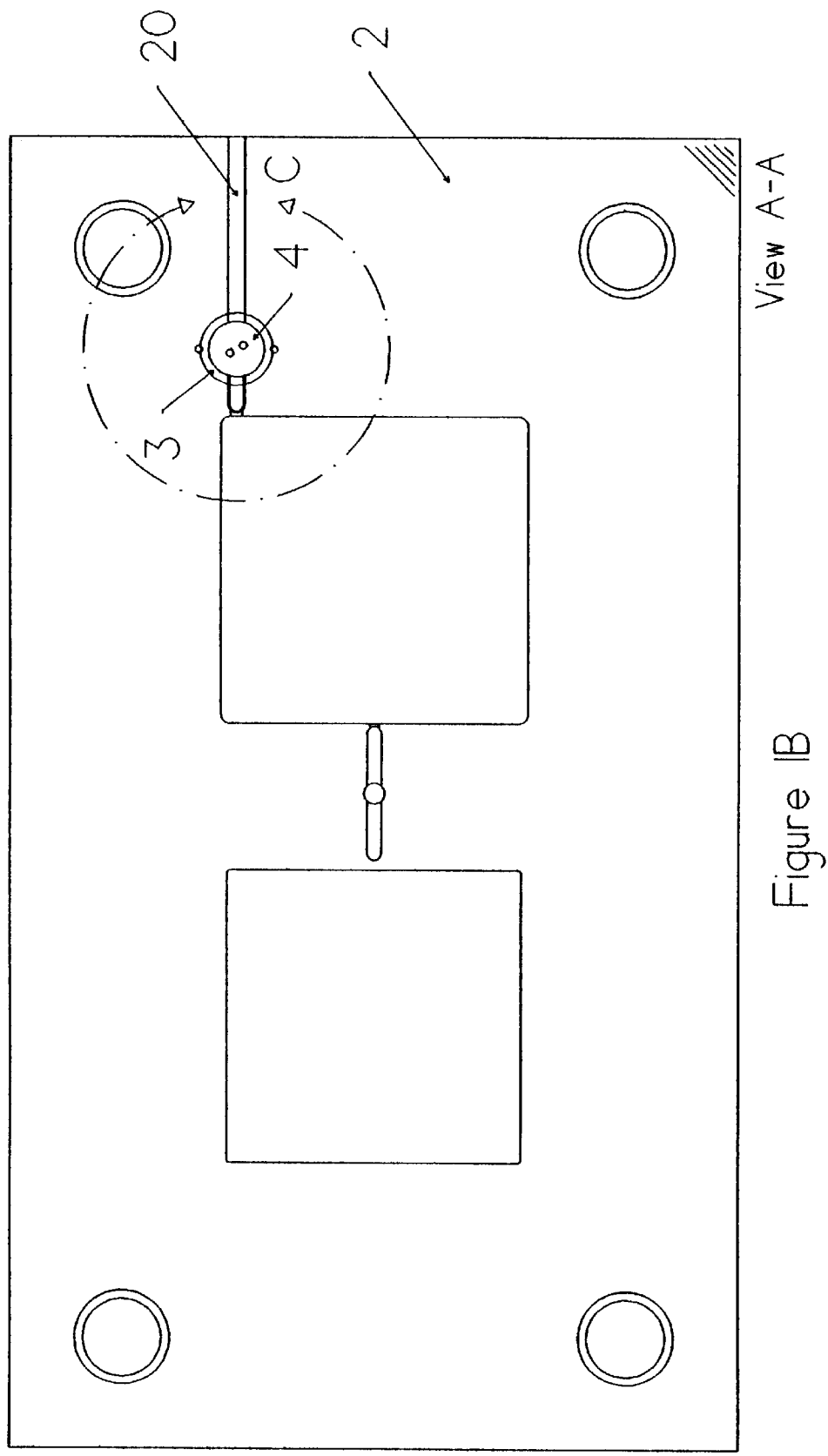
FIG. 1B is a sectional side view of the cavity of FIG. 1A along the lines A—A.
Figure 1C:
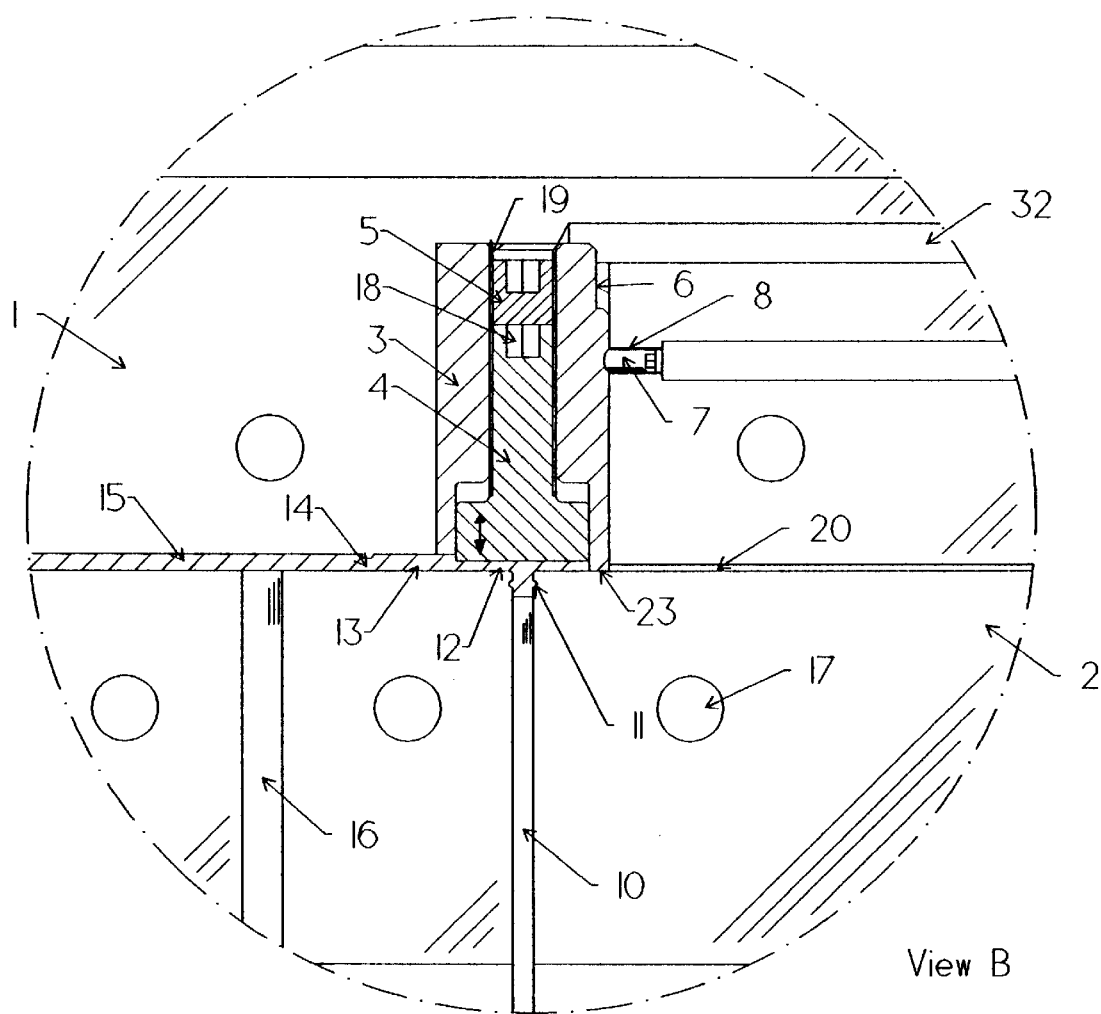
FIG. 1C is an enlarged side view of that part of FIG. 1A contained within the circle B.
Figure 1D:
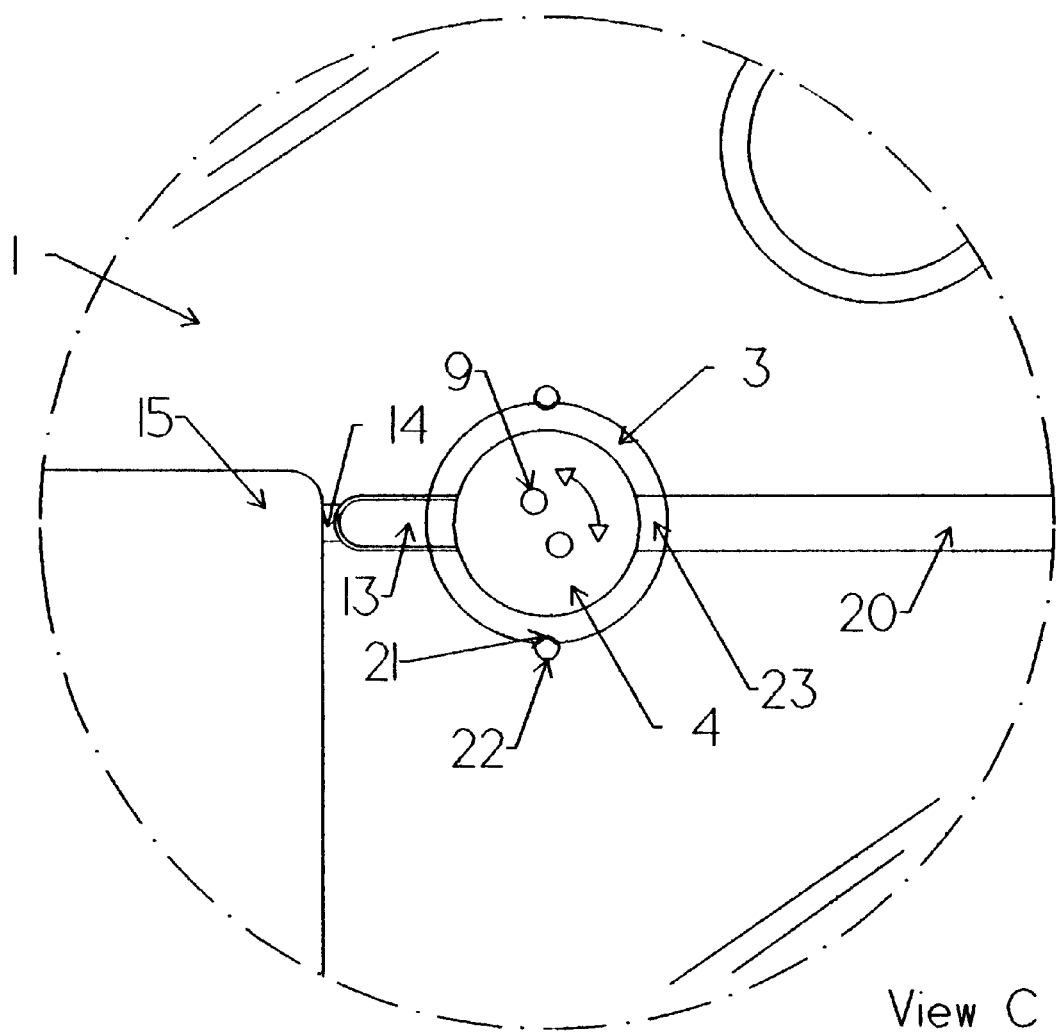
FIG. 1D is an enlarged side view of that part of FIG. 1B contained within the circle C.
Figure 2A:
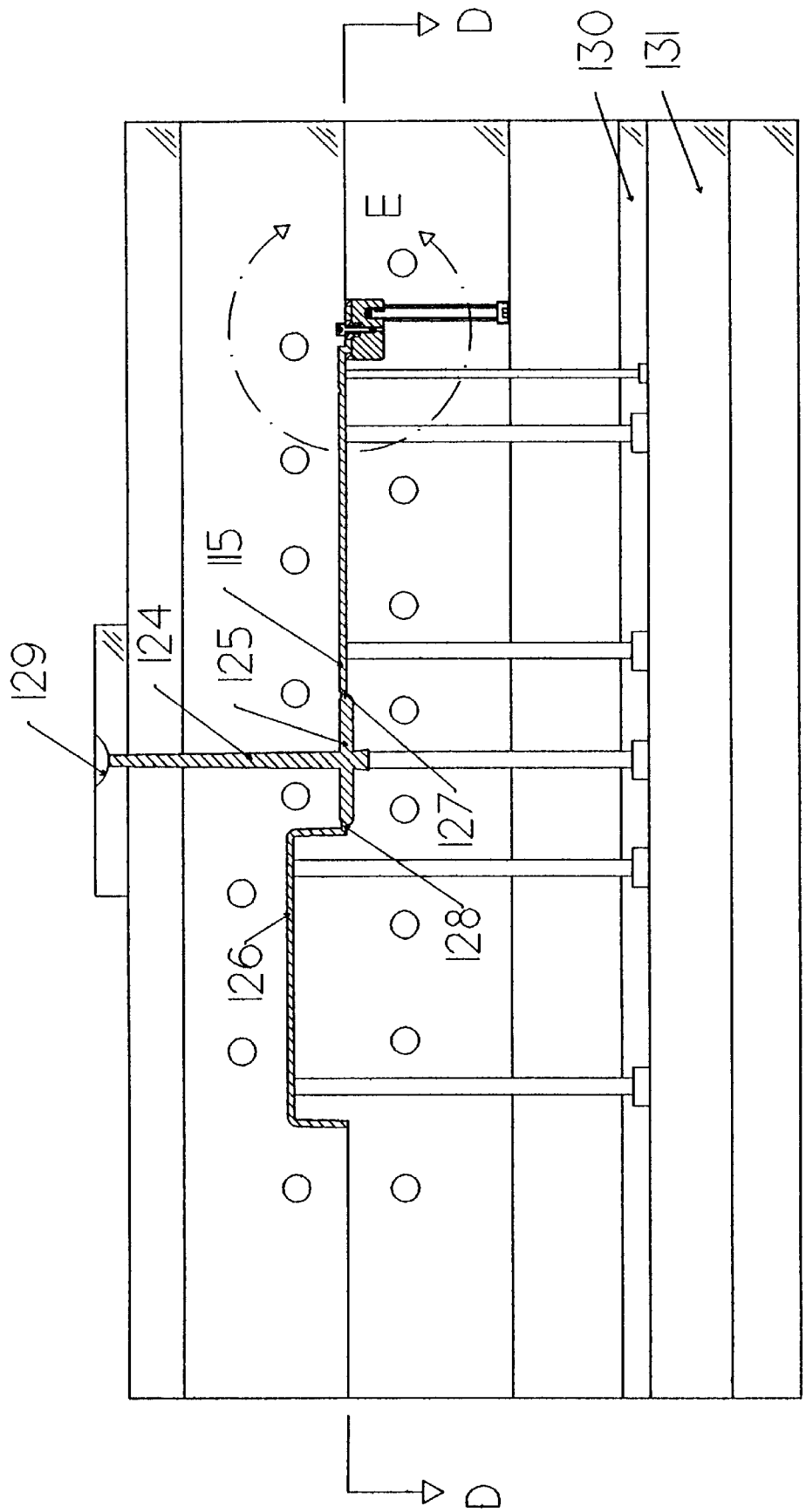
FIG. 2A is a top view of a molding system having two cavities in addition to an adjustable cavity that is longitudinally adjustable.
Figure 2B:
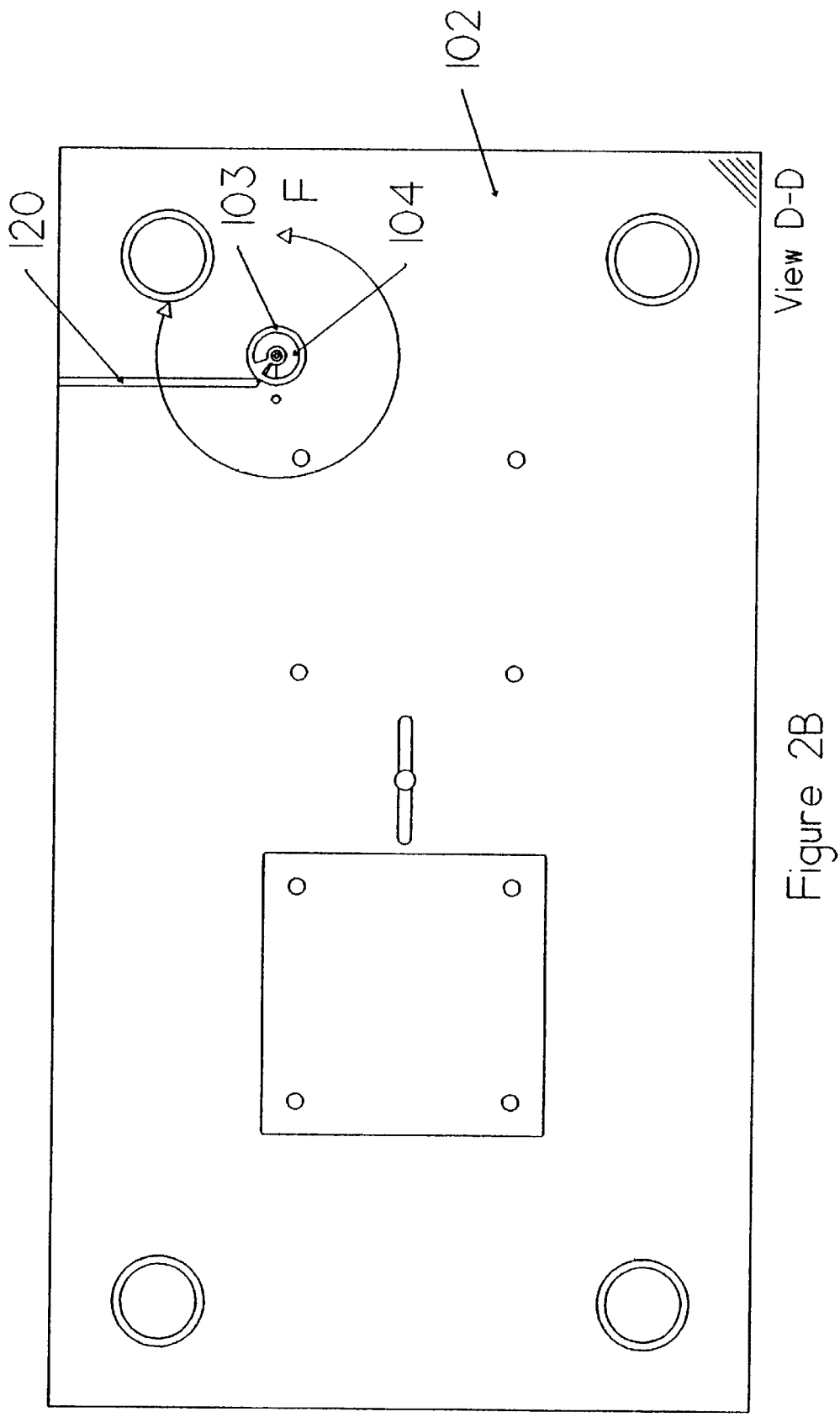
FIG. 2B is a sectional side view of the molding system of FIG. 2A along the lines D—D.
Figure 2C:
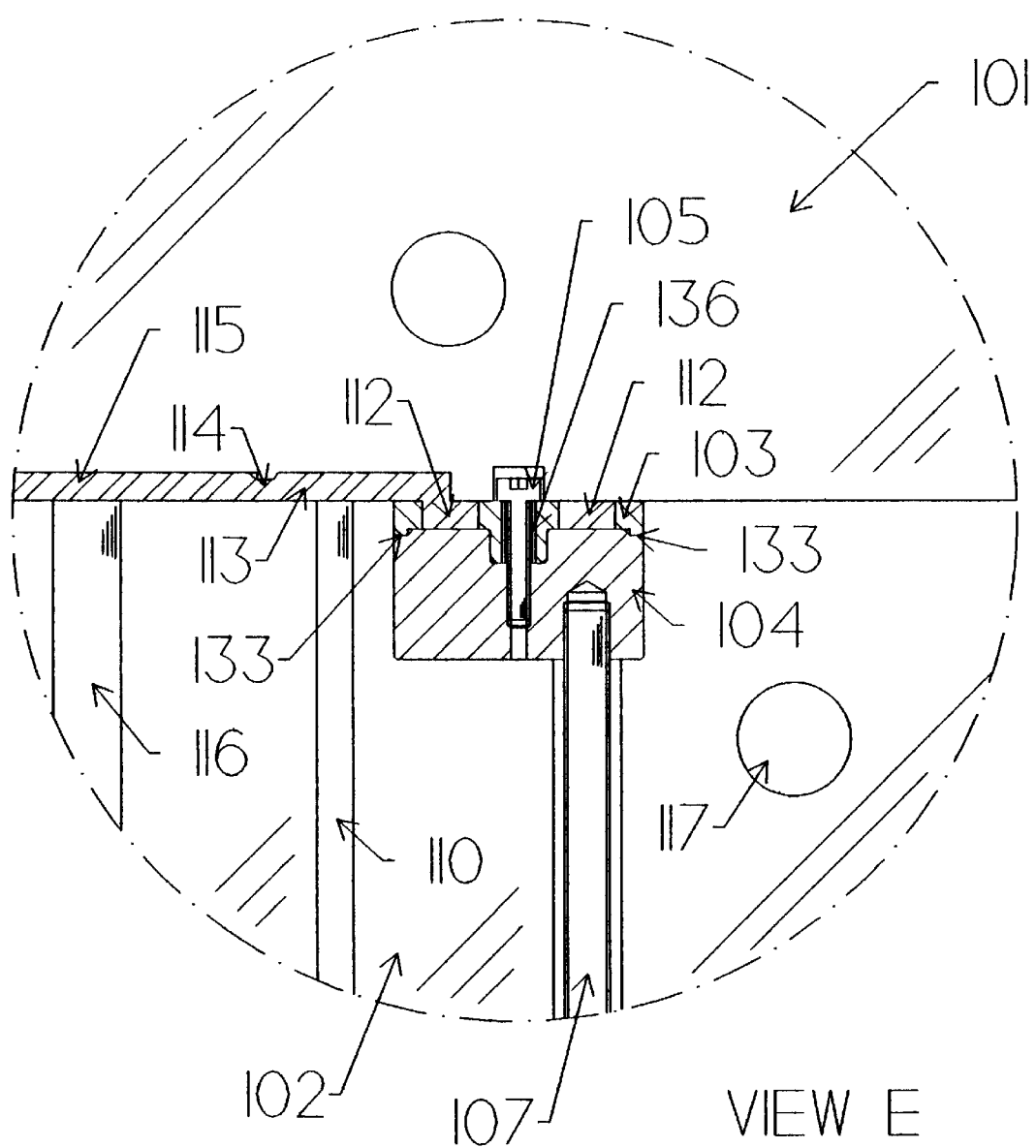
FIG. 2C is an enlarged side view of that part of FIG. 1A contained within the circle E.
Figure 2D:
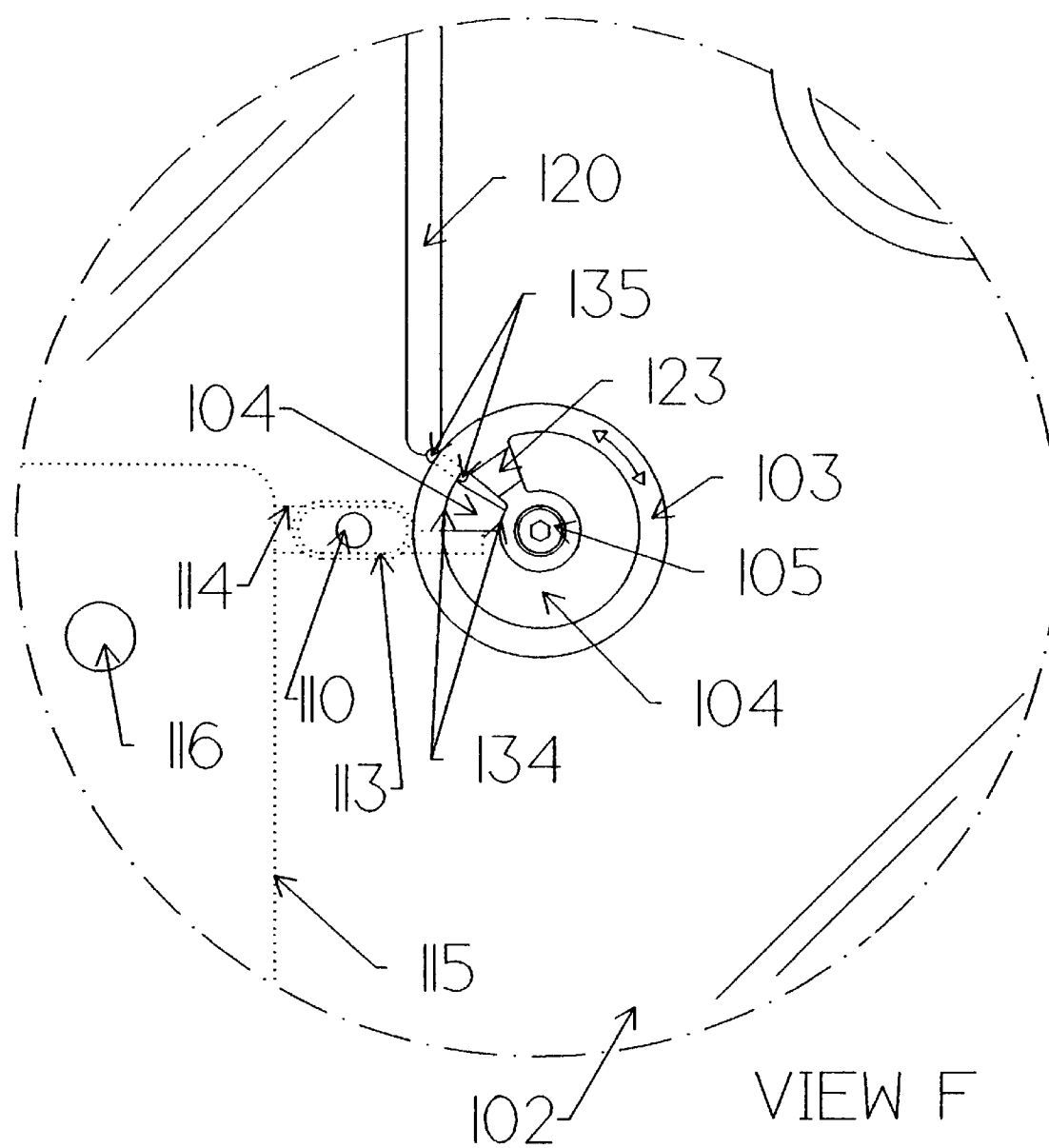
FIG. 2D is an enlarged side view of that part of FIG. 2B that is contained within the circle F.
Figure 3A:
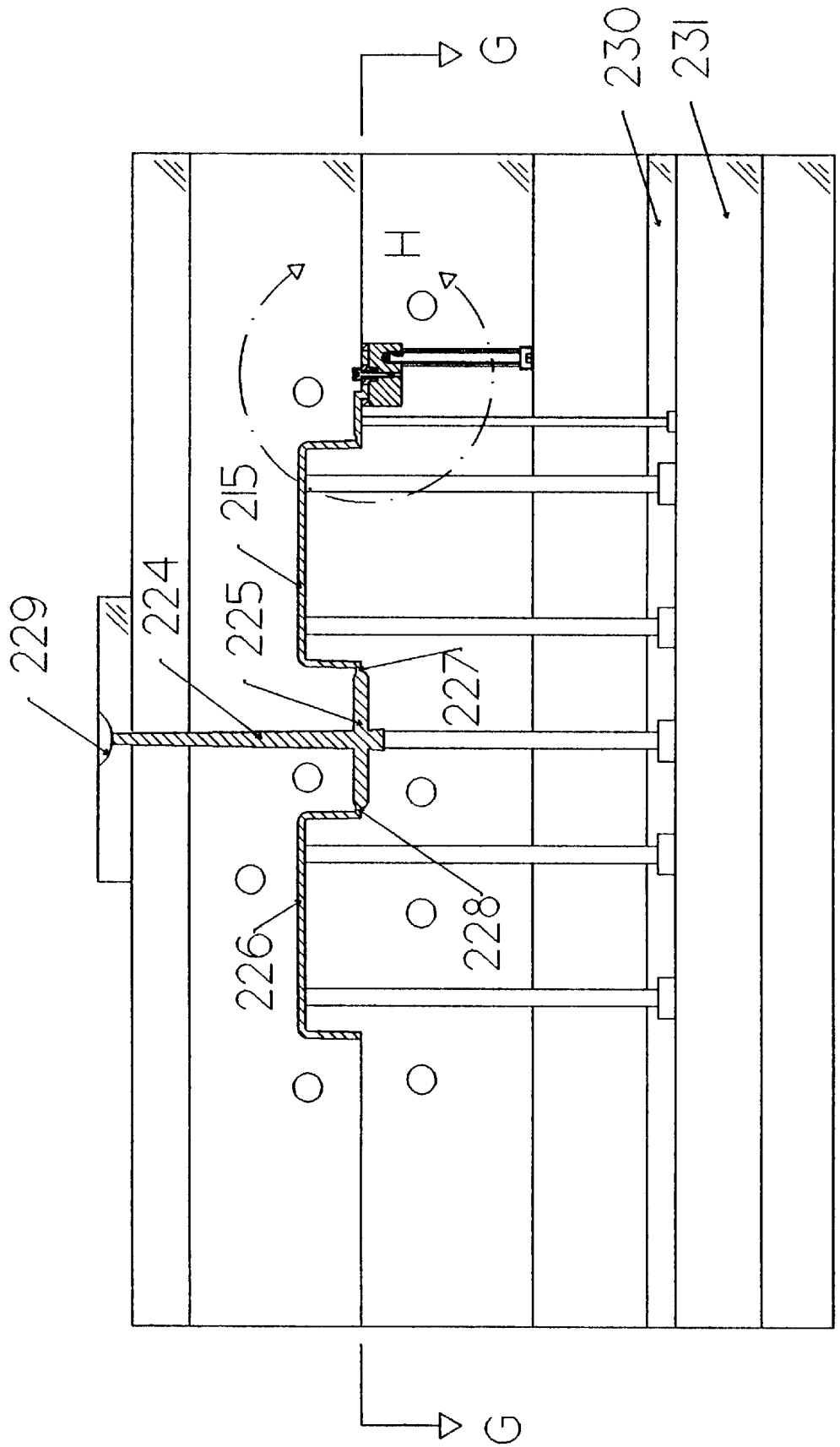
FIG. 3A is a top view of a multi-cavity molding system having two cavities that are identical to one another with an overflow cavity connected to the first to fill cavity.
Figure 3B:
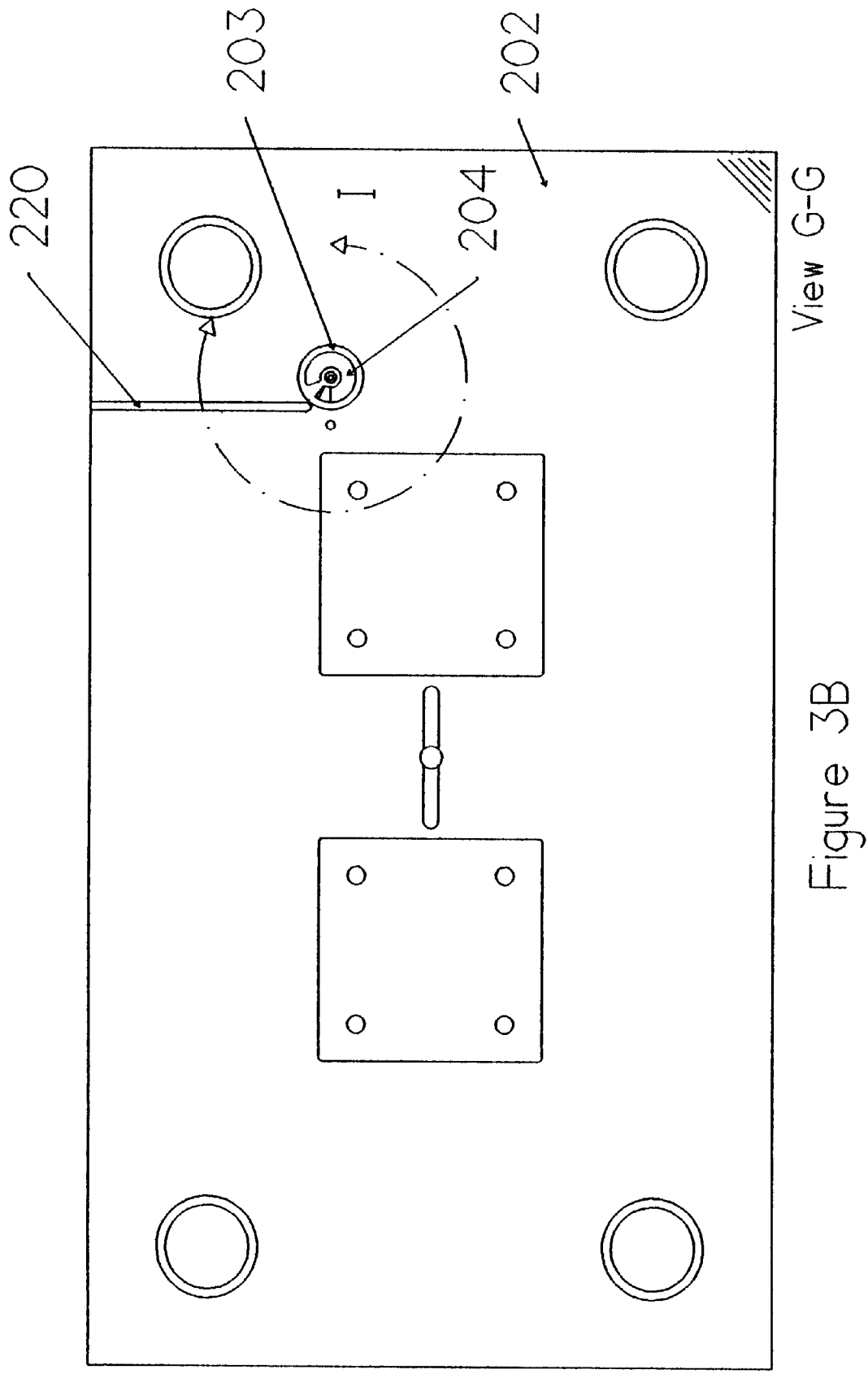
FIG. 3B is a sectional side view of FIG. 3A along the lines G—G.
Figure 3C:
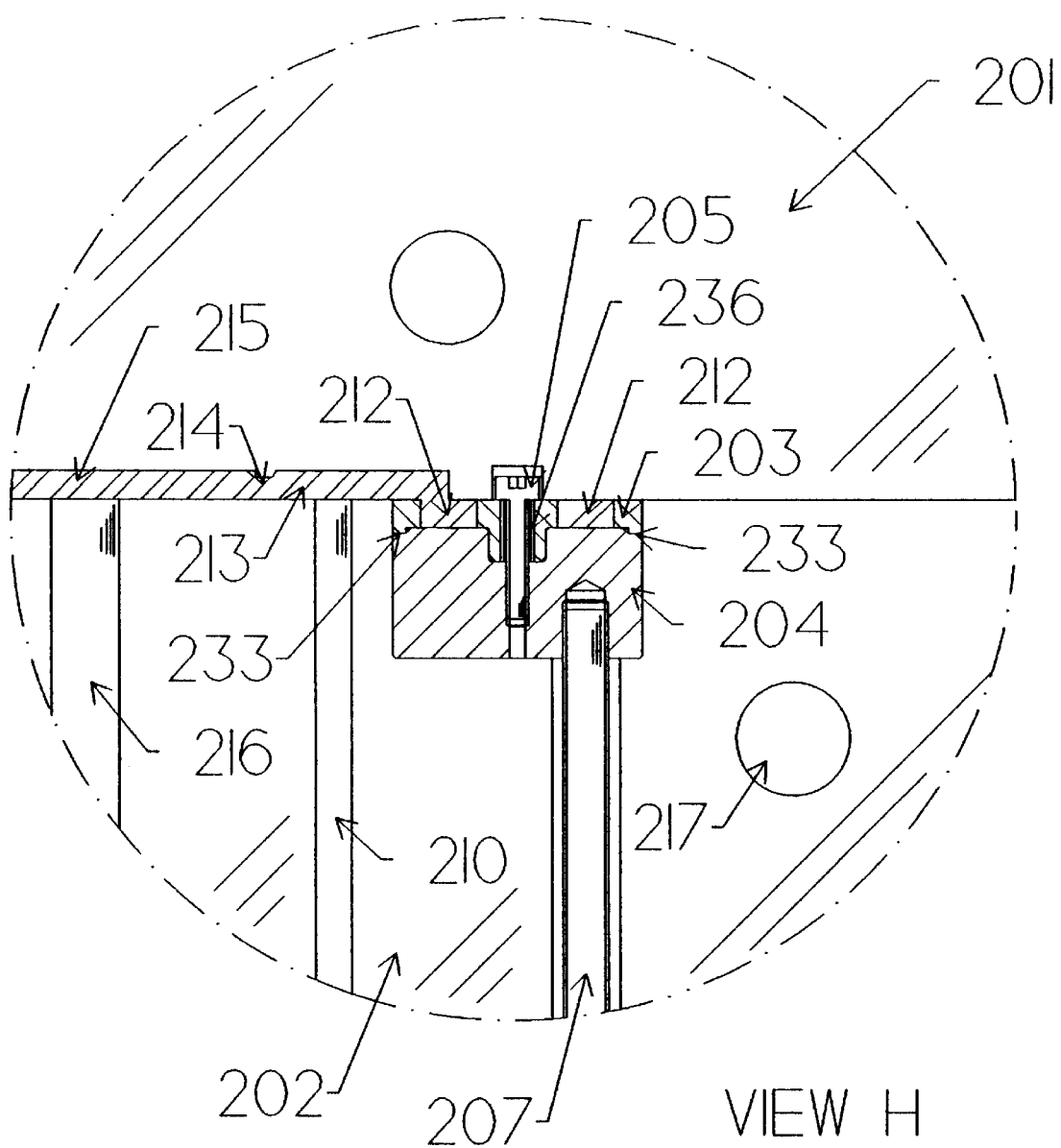
FIG. 3C is an enlarged side view of that part of FIG. 3A contained within the circle H.
Figure 3D:
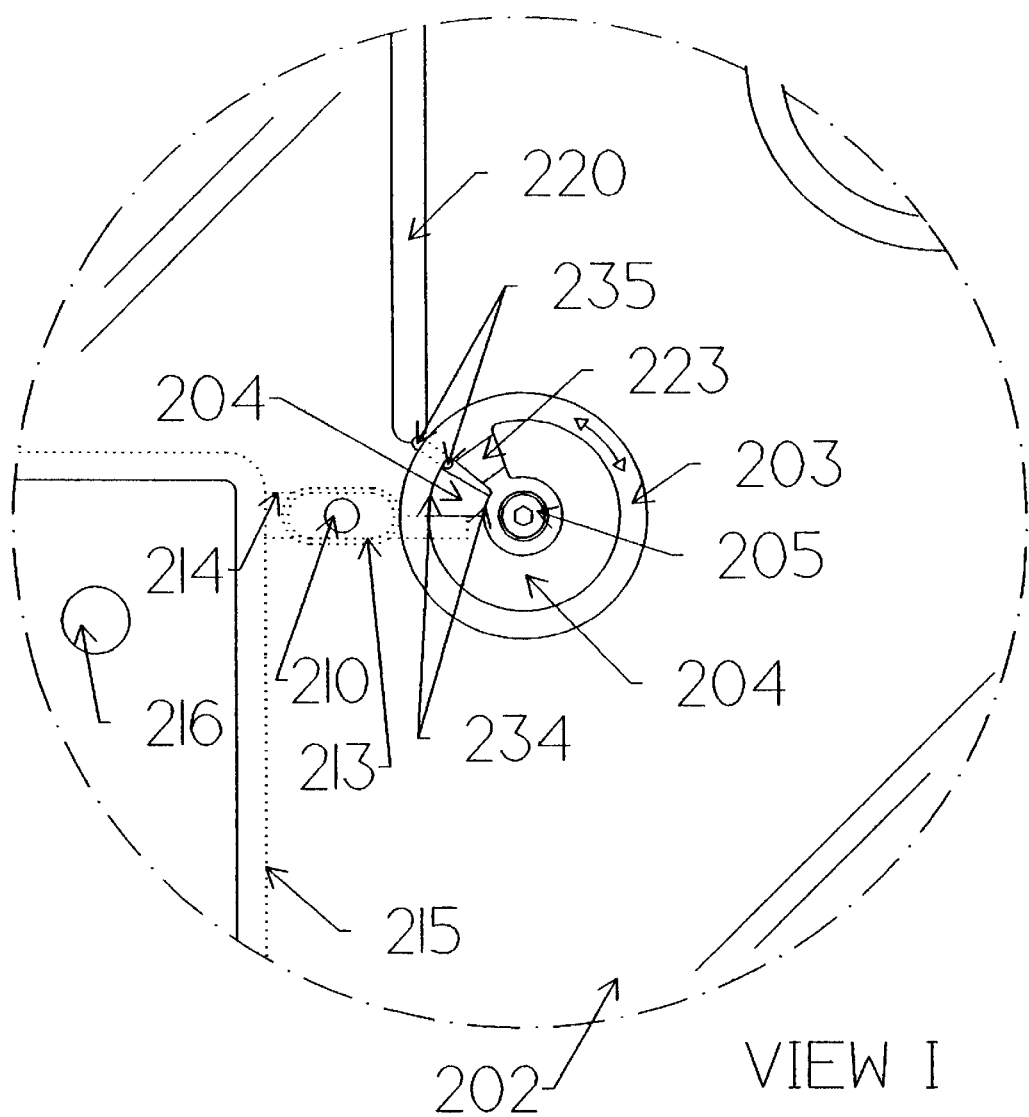
FIG. 3D is an enlarged side view of that part of FIG. 3B contained within the circle I.

FIGS. 1A, 1B, 1C, 1D show a typical plastic injection mold with cavities for two dimensionally unique parts 15, 26. Plastic is injected into the mold by a plastic injection molding machine. The nozzle of the molding machine contacts the mold at 29. During injection, plastic flows through the sprue 24 to the runner 25 and enters the part cavities 15 and 26 through small entrance points (gates) 27 and 28 respectively. The cavities 15 and 26 fill as plastic continues to be injected into the mold.

Plastic fills cavity 15 prior to cavity 26. In order to maintain a proper filling balance between cavities, the cavities should fill with equal pressure and at the same time. This is achieved by allowing plastic from the cavity that fills first to enter an overflow cavity 12 through an exit gate 14 and connecting passageway 13. The resistance to flow determines the rate at which the overflow cavity fills. By varying this resistance, the time to fill can be adjusted to balance the filling of the cavities.

The resistance to flow that the plastic experiences in the overflow cavity 12 is adjusted by varying the position of the threaded piston 4 within a housing 3 by rotating the piston clockwise or counterclockwise using feature 9 after loosening the set screw 5. This will change the wall thickness of the overflow cavity 12 resulting in a change in the resistance to material flow.

The cavity thickness can be altered at the injection molding press without removing the overflow cavity from the injection mold. Once a suitable thickness is found such that a balance is achieved, the housing 3 is removed and the set screw 5 is tightened into position against the piston 4 to prevent further rotation. Feature 6 can be used to hold the housing 13 during this procedure. The set screw 7, in the threaded hole 8, is used to hold the overflow cavity assembly 3, 4, 5 in the mold plate 1.

A small feature 11 is molded as an undercut in the ejector pin hole in mold plate 2 to facilitate removal of the molded disk from cavity 12. The disk is ejected with parts 15 and 26 by the normal function of the ejector system which consists of ejector pins 10 and 16 connected to ejector plate 31 and holding plate 30.

Proper heat removal is provided to the mold by cooling channels 17. The overflow cavity is vented by a very shallow vent 23 connected to a channel 20 which connects to atmosphere.

Easy removal of the overflow cavity assembly 3, 4, 5 is facilitated by partial threaded holes 21 in the housing 3. Shallow clearance holes in the mold 1 allow screws to be turned into the threaded holes 21 of the housing 3. When the screws bottom out, continued turning forces the assembly to come out of the mold, allowing complete removal by hand.

FIGS. 2A, 2B, 2C, 2D show a typical plastic injection mold with cavities for two parts 115, 126 that are dimensionally unique relative to each other. Plastic is injected into the mold by a plastic injection molding machine. The nozzle of the molding machine contacts the mold at 129. During injection, plastic flows through the sprue 124 to the runner 125 and enters the part cavities 115 and 126 through small entrance points (gates) 127 and 128 respectively. The cavities 115 and 126 fill as plastic continues to be injected into the mold.

Plastic fills cavity 115 prior to cavity 126. In order to maintain a proper balance between cavities, the cavities should fill with equal pressure and at the same time. This is achieved by allowing plastic from the cavity that fills first to enter an overflow cavity 112 through a gate 114 and connecting passageway 113. The flow length determines when the overflow cavity fills. By varying this flow length, the time to fill can be adjusted to balance the filling of the cavities.

The overflow cavity shape 112 is determined when the mold halves are closed together in the injection molding press. The mold plate 101 is pressed into the top surface 103 and a seal off 134 is present between the end stop 103 and the body 104 to establish a single path spiral for the material to flow through.

The flow length that the plastic experiences in the overflow cavity 112 is adjusted by varying the angular position of the end stop 103 within its housing 104. This is accomplished by removing screw 105 and by using a screw in threaded hole 136, removing the end stop. The end stop is repositioned to shorten or lengthen the flow path of the material in cavity 112. End stop 103 is held in position by engaging teeth 133. These teeth 133 encircle the perimeter of the mating surface between the end stop 103 and body 104.

The molded shape from cavity 112 is ejected with parts 115 and 126 by the normal function of the ejector system which consists of ejector pins 110 and 116 connected to ejector plate 131 and its holding plate 130.

Proper heat removal is provided to the mold by cooling channels 117. The overflow cavity is vented by very shallow vents 123 connected to channels 120 and 135 which connect to atmosphere.

Screw 107 retains the body 104 to the mold plate 102 and ensures proper orientation of the overflow assembly during insertion into the mold.

FIGS. 3A, 3B, 3C, 3D show a multi-cavity high pressure injection molding system with cavities 215, 226 for identical parts. Plastic is injected into the mold by a plastic injection molding machine (not shown). The nozzle of the molding machine contacts the mold at 229. During injection, plastic flows through a sprue 224 to the runner 225 and enters the cavities 215, 226 through small entrance points or gates 227, 228 respectively. Even though the cavities are identical to one another, due to subtle differences in the construction of the mold, for example, wall thickness of cavities, runner and gate dimensions, location of cooling lines, etc., there may be an imbalanced condition. The imbalanced condition causes the cavity 215 to fill before the cavity 226 and the cavity 215 is therefore the first to fill cavity as plastic is injected into the mold.

In order to maintain a proper filling balance between the cavities, the cavities should fill with equal pressure at the same time. This is achieved by allowing plastic from the cavity 215 to enter an overflow cavity 212 through a gate 214 and connecting passageway 213. The resistance to flow determines the rate at which the overflow cavity fills. By varying this resistance, the time to fill the cavity can be adjusted to balance the filling rates of the cavity 226 with the cavity 215 and the overflow cavity 212.

The resistance to flow that the plastic experiences in the overflow cavity 212 is adjusted by varying the angular position of an end stop 203 within a body 204. This is accomplished by removing screw 205 and by using a screw and threaded hole 136 to remove the end stop 203. The end stop 103 is repositioned to shorten or lengthen the flow path of the material in the cavity 212. The end stop 203 is held in position by engaging teeth 233. The teeth 233 encircle a perimeter of the mating surface between the end stop 103 and the body 104.

The molded shape from cavity 212 is ejected with parts made in cavities 215, 226 by the normal function of the ejector system. The ejector system consists of ejector pins 210, 216 that are connected to ejector plate 231 and holding plate 230. Proper heat removal is provided to the mold by cooling channels 217. The overflow cavity 212 is vented by very shallow vents 223 connected to channels 220 and 235 which are connected to atmosphere.

Screw 207 retains the body 204 in the molded plate 202 and insures the proper orientation of the overflow assembly during insertion into the mold.

In FIGS. 4A, 4B, 4C, 4D, 4E, 4F and 4G, there is shown a molding system that is almost identical to the molding system shown in FIGS. 1A to 1D except that the molding system shown in FIGS. 4A to 4G contains an automatic degating exit gate. The same reference numerals are used in FIGS. 4A to 4G for those components that are identical to those shown in FIGS. 1A to 1D. Some of the identical components are not described in the description to FIGS. 4A to 4G as that description would simply be a repetition of the description for FIGS. 1A to 1D. In FIGS. 4A to 4G, it can be seen that there is an exit gate insert 337 containing a dowel pin 338. As can be seen from FIG. 4G, the exit gate insert 337 has a loop 340 that extends into the passage through which the plastic flows from the cavity 15 through the exit gate 14 and into the connecting passageway 13 to the overflow cavity 12. The loop 340 is sized so that it does not interfere with the flow of plastic into the overflow cavity 12.

Figure 4A:
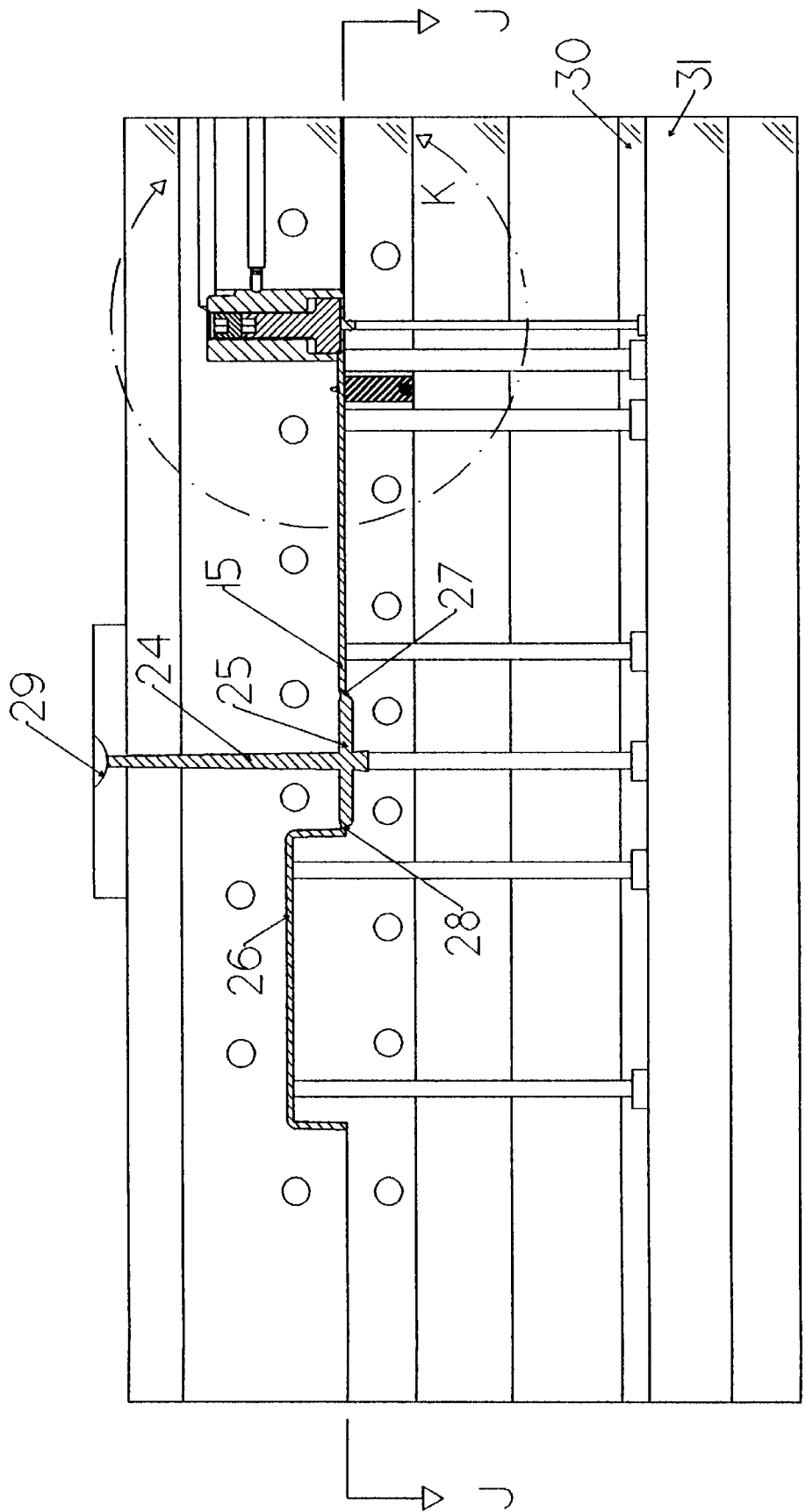
FIG. 4A is a top view of a multi-cavity molding system having an adjustable overflow cavity with a looped gate passage connected between the overflow cavity and the cavity to which the overflow cavity is connected.
Figure 4B:
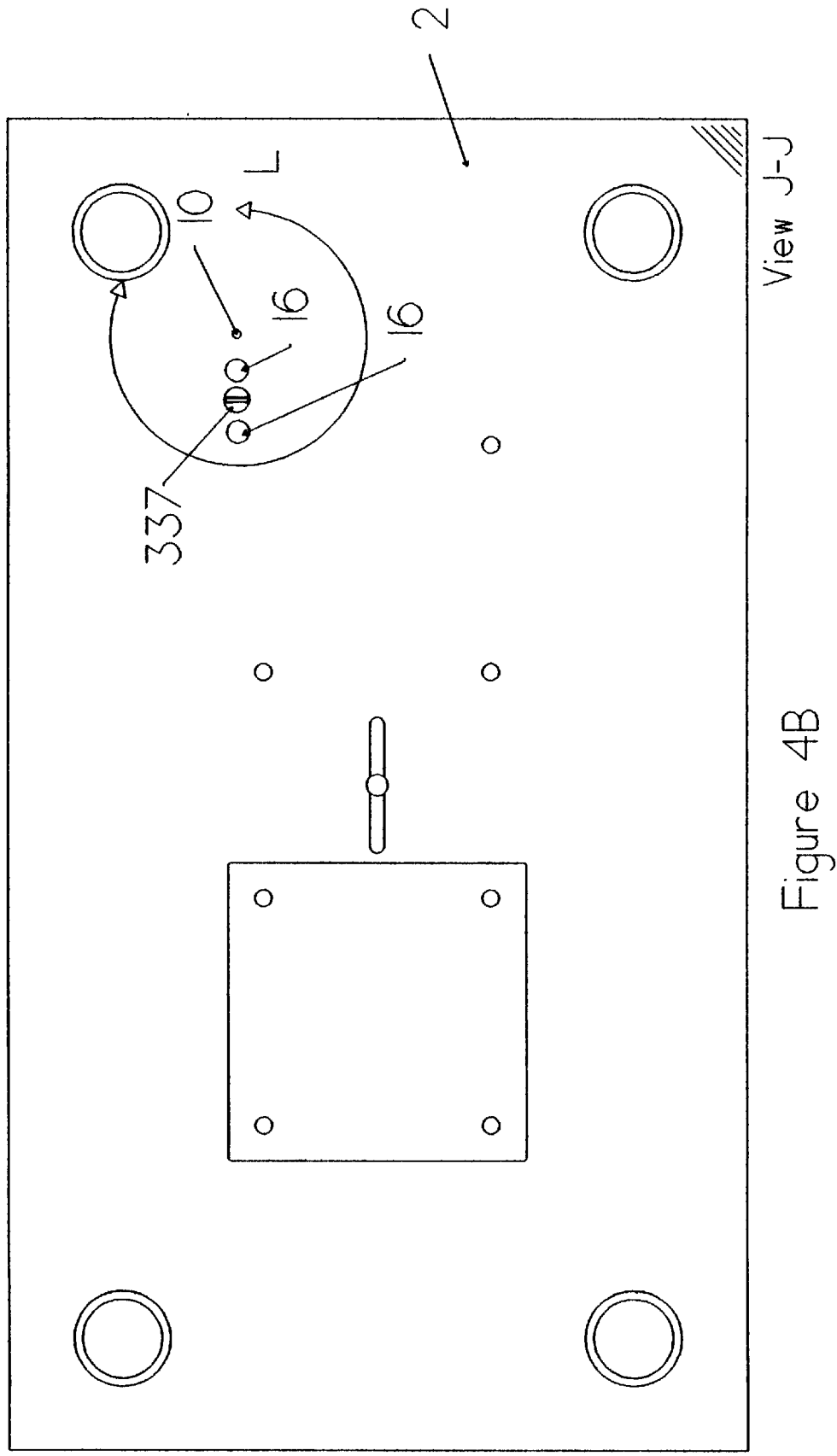
FIG. 4B is a sectional side view of FIG. 4A along the lines J—J.
Figure 4C:
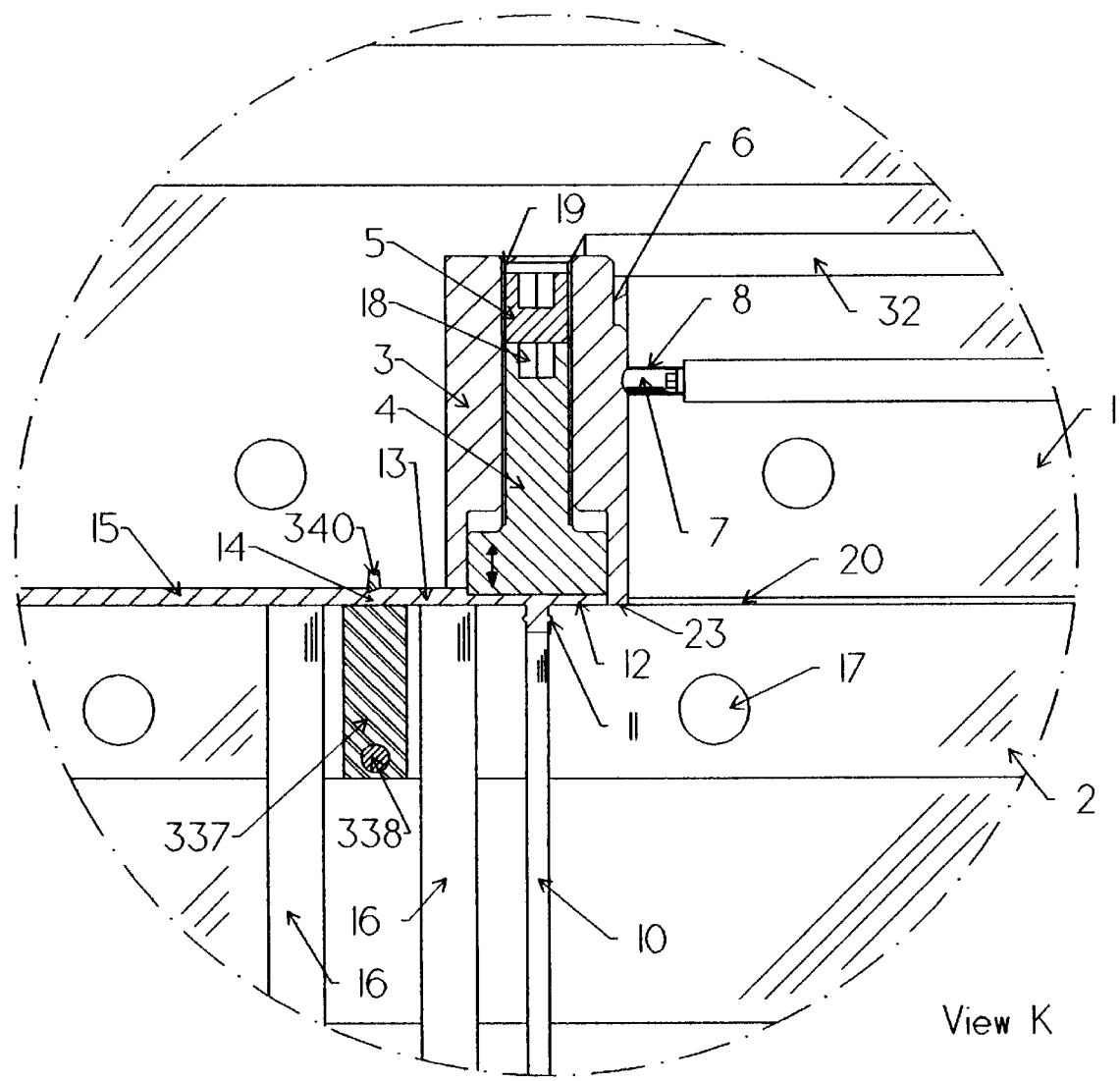
FIG. 4C is an enlarged side view of that part of FIG. 4A contained within the circle K.
Figure 4D:
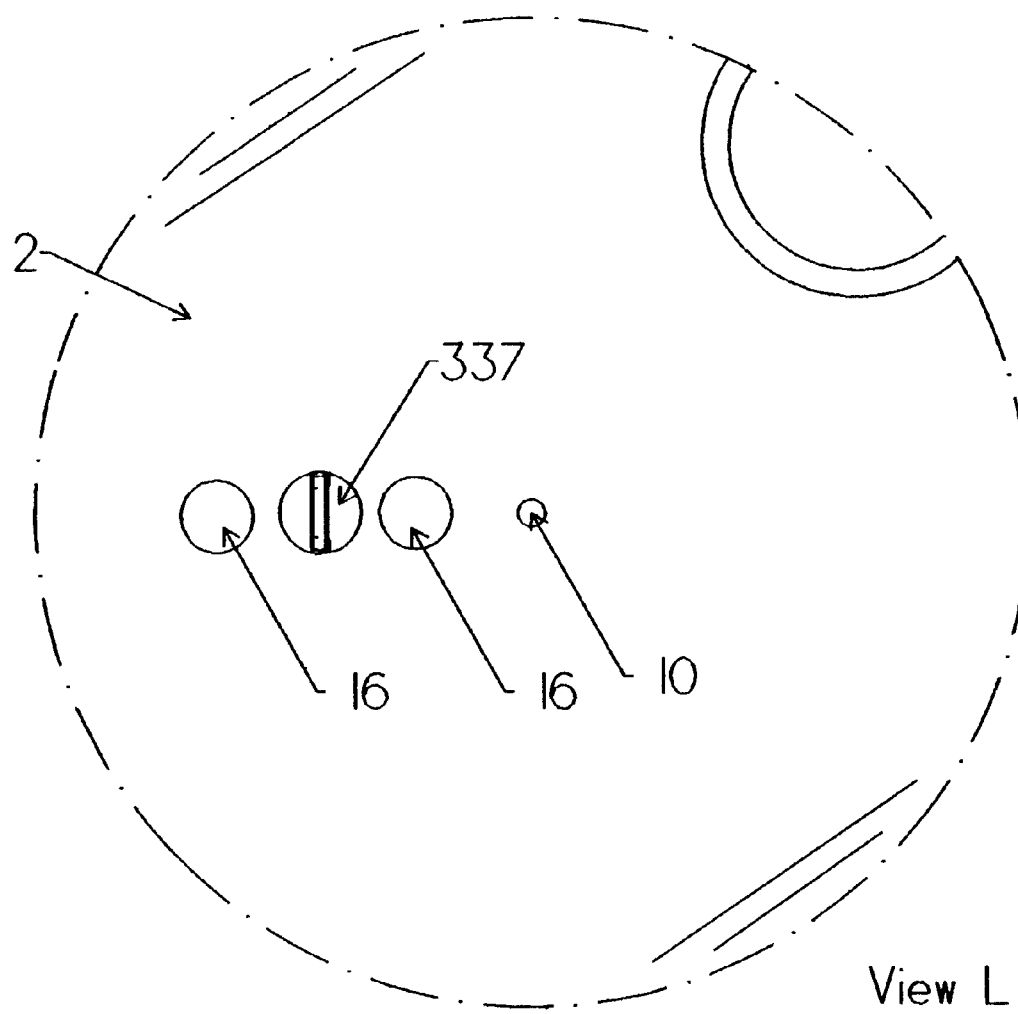
FIG. 4D is an enlarged side view of that part of FIG. 4B contained within the circle L.
Figure 4E:
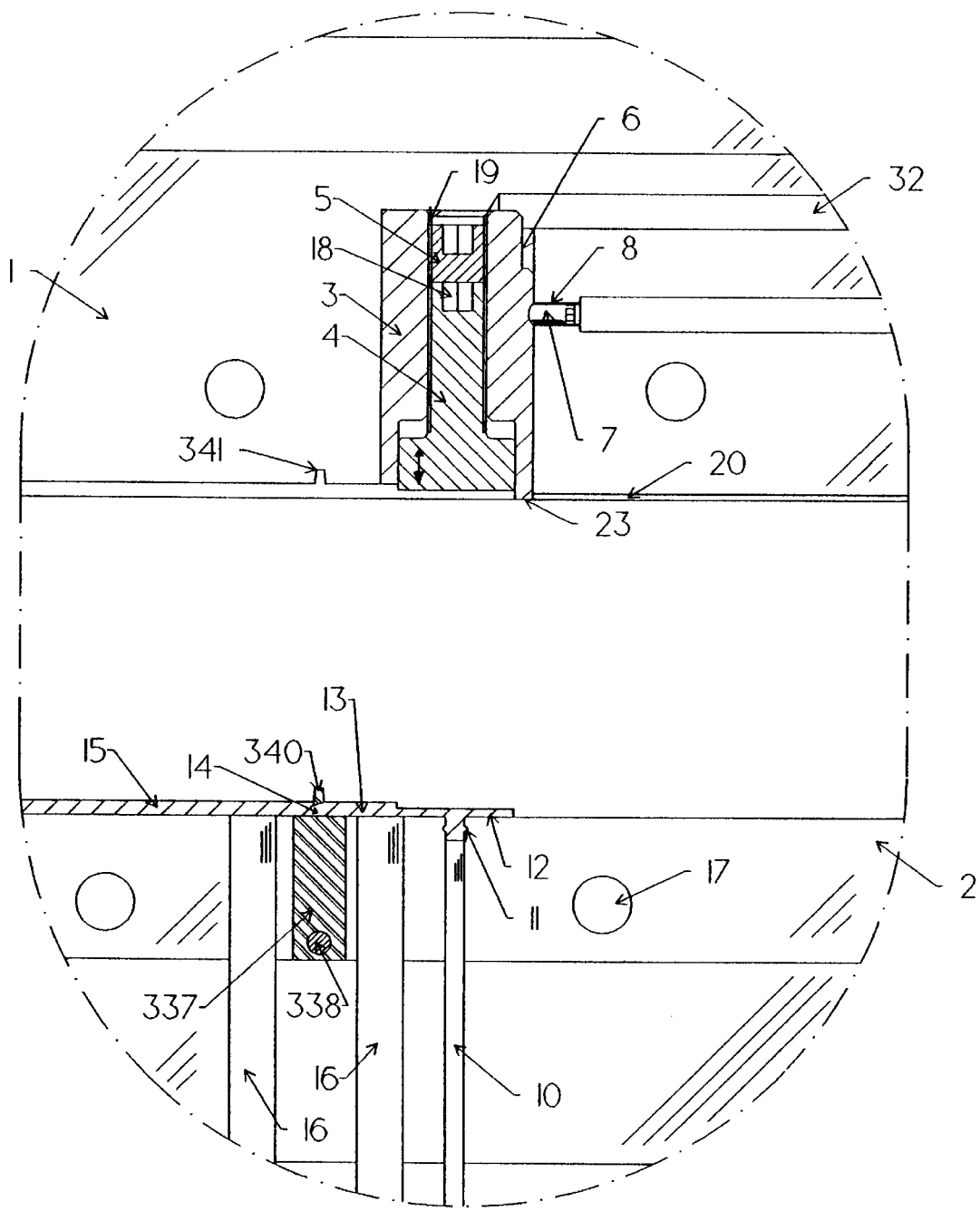
FIG. 4E is an enlarged side view of the components contained in the circle 4E when the mold is initially opened.
Figure 4F:
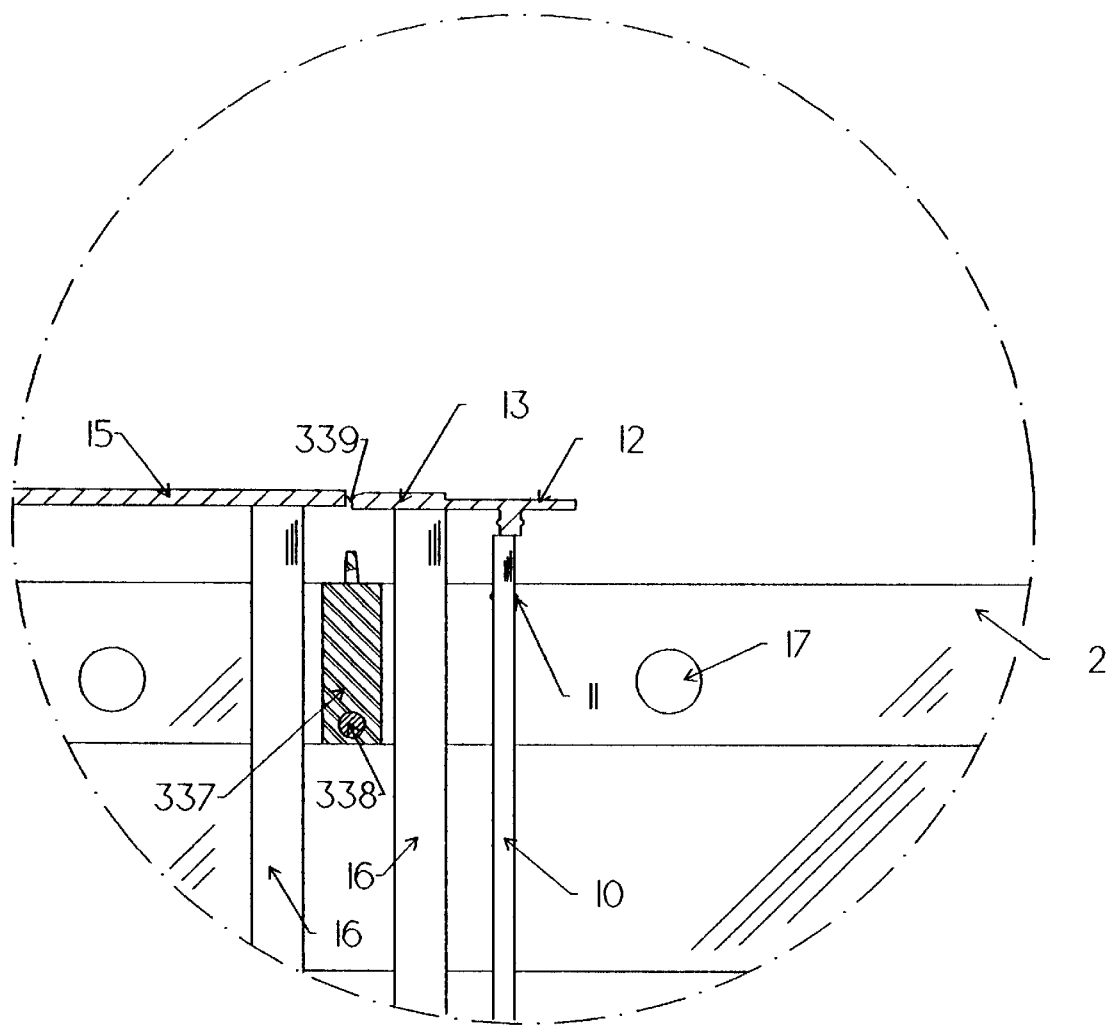
FIG. 4F is a partial side view of the components contained in FIG. 4E when the injector pins are activated.
Figure 4G:
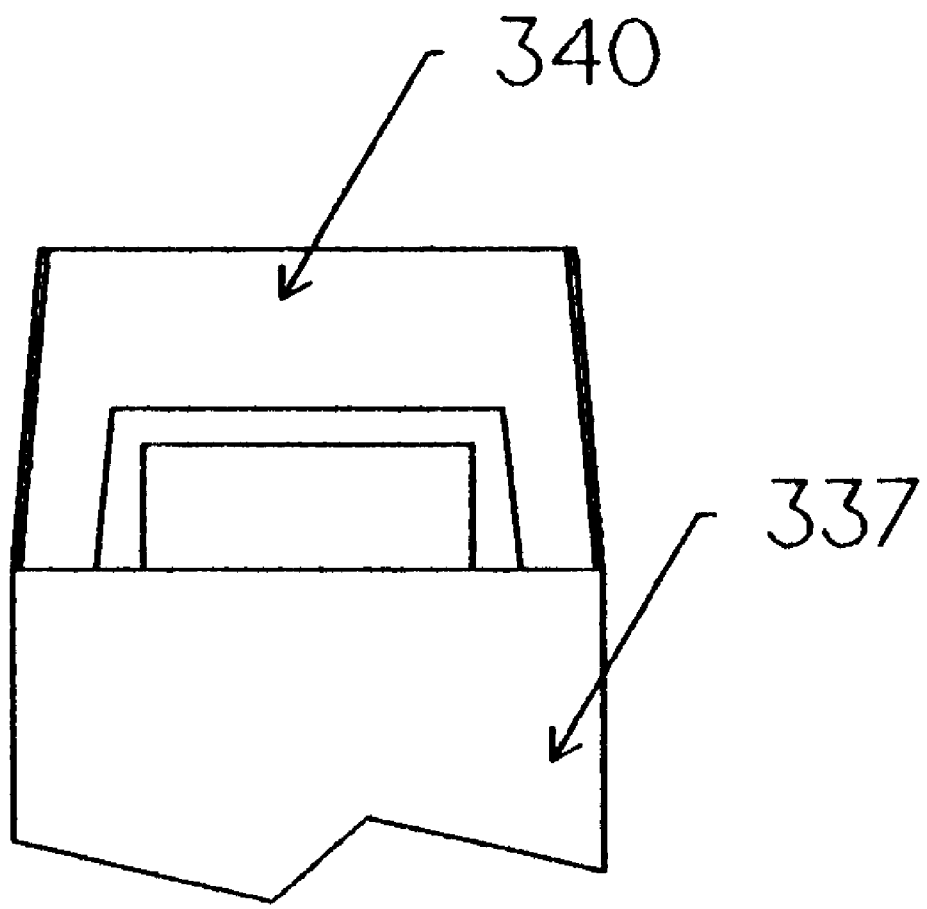
FIG. 4G is a side view of a looped gate passage.

When the molding process is nearly complete and the plastic in the cavities has cooled sufficiently, the mold is opened as shown in FIG. 4E. The loop 340 is located precisely at an inner edge of the cavity 15. Next, the ejector pins 10, 16 are activated. The pins 10, 16 are connected to ejector plate 31 and holding plate 30. This moves the plastic within the cavity 15, the connecting passageway 13 and the overflow cavity 12 relative to the exit gate insert 337 and the loop 340 causing the plastic to sever at gate 339 as shown in FIG. 4F. The loop 340 and exit gate insert 337 comprise a looped gate passage. While the looped gate passage is shown as being located in the passageway between the second cavity and the overflow cavity, it could be located at an inlet edge of the first cavity or the second cavity. In molding systems with more than two cavities, the looped gate passage could be located to sever material at other locations as well.

Also, the invention can be utilized with one or more overflow cavities that are not adjustable or an adjustable overflow cavity or cavities can be used in the same system with a non-adjustable overflow cavity or cavities.

I claim:

1. A method of high pressure injection molding in a molding system containing at least one cavity having a passageway connected thereto, a looped gate passage affixed to a removable gate insert, said looped gate passage being located at an edge of said at least one cavity so that material passing through said passageway must pass through said looped gate passage, said looped passage being sized so as not to limit the flow of material through said passage, said method comprising mounting said looped gate passage so that when said mold is opened said looped gate passage can be moved relative to said material, to sever said material within said looped gate passage from material within said cavity.

2. A high pressure injection molding system for material to be molded comprising at least one cavity having a passageway connected thereto, a looped gate passage affixed to a removable gate insert, said looped gate passage being located in said passageway at an edge of said at least one cavity so that material flowing through said passageway must pass through said looped gate passage, said looped gate passage being mounted so that when said mold is opened, said looped gate passage can be moved relative to said material, said looped gate passage being sized so as not to limit the flow of material through such passage, thereby severing the material within said looped gate passage from material within said cavity.

* * * * *